Oct. 9, 1956 P. P. ANDRES 2,765,957
FLAT SEEDER
Filed Feb. 25, 1954
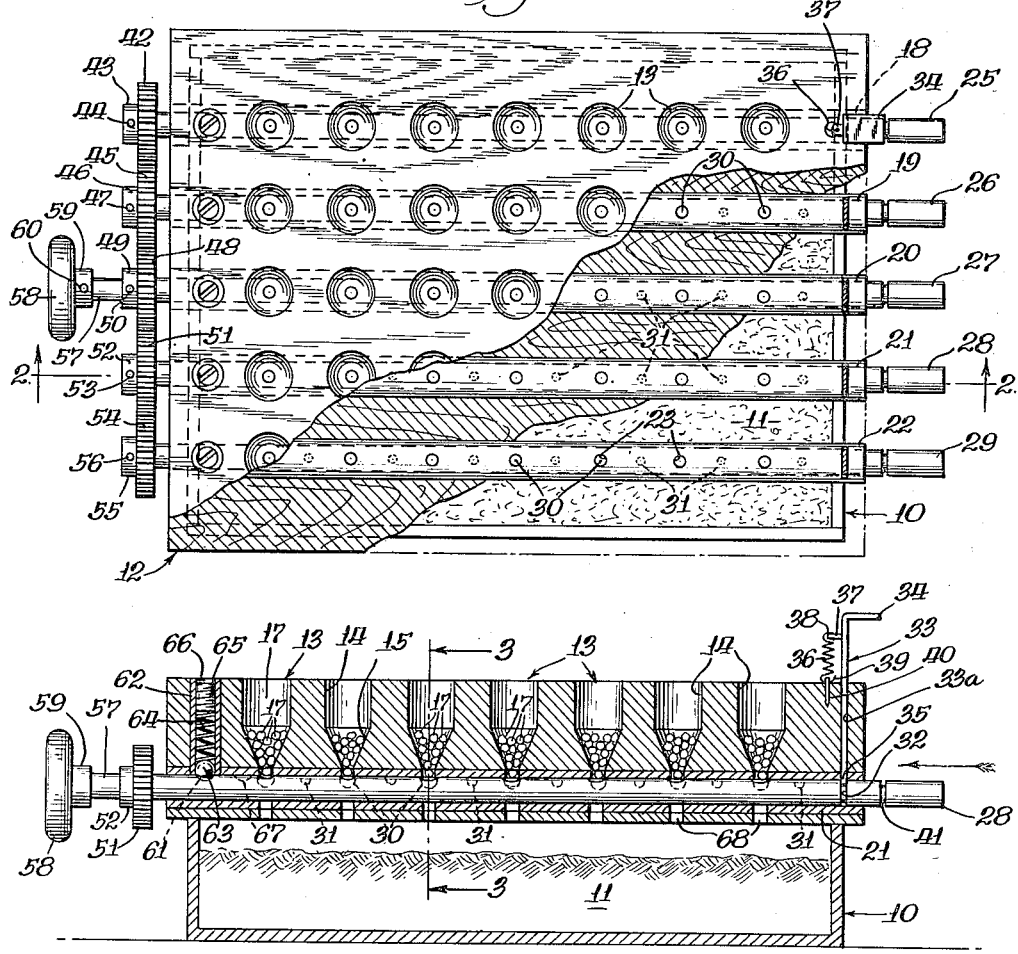
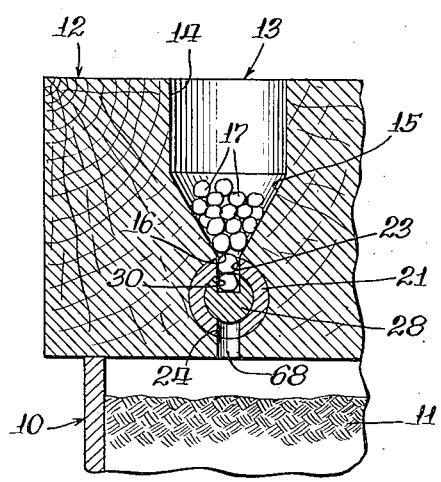
INVENTOR.
Peter P. Andres
BY
Kenneth T. Snow
Atty.

United States Patent Office 2,765,957
Patented Oct. 9, 1956

2,765,957
FLAT SEEDER

Peter P. Andres, River Grove, Ill.

Application February 25, 1954, Serial No. 412,481

8 Claims. (Cl. 222—139)

This invention relates to a new and improved flat seeder.

The flat, as mentioned in the title of this invention, are those shallow boxes used by florists and greenhouse keepers in the growing of plants from seed. At the present time the seeding of these flats require much manual labor. It is the desire of the person seeding these flats to uniformly spread the seed at regularly spaced intervals over the entire surface of the flats and further to attempt to plant only a single seed in any one location. This, of course, is extremely difficult and it is with these objects in mind that the device of the present invention was conceived.

A principal object of this invention is to provide a device for mechanically dispensing seed.

Another important object of this invention is the provision of means for dispensing individual seeds.

Another and further important object of this invention is to provide an apparatus with means for dispensing individual seeds of various sizes.

A still further important object of this invention is to supply a device which will simultaneously dispense a plurality of individual seeds over a surface.

A still further important object of this invention is to equip a device with means for uniformly dispensing individual seeds over a flat at regularly spaced apart positions.

Another and still further important object of this invention is to provide a seed dispenser which is capable of operating with various size seeds and to uniformly drop these seeds at regular spaced apart locations over a flat to be seeded.

A further important object of this invention is to supply a flat seeder for dispensing multiple units of seed at one time and simultaneously conveniently indexing the seeder whereby the device may have its operation repeated as often as desired.

Other and further important objects and advantages of this invention will become apparent from the disclosures in the following specification and accompanying drawing.

In the drawing:

Figure 1 is a top plan view of the plant seeder of this invention.

Figure 2 is a longitudinal sectional view of the plant seeder taken on the line 2—2 of Figure 1.

Figure 3 is an enlarged sectional view taken through one of the seed cups on the line 3—3 of Figure 2.

As shown in the drawing:

The reference numeral 10 indicates generally a florist's flat which consists of a shallow box substantially filled with dirt 11 to receive seed for planting. The device of this invention comprises a frame supporting structure 12 which is adapted to be placed upon the top of the florist's flat 10 and by means hereafter to be described effect a dispensing of seed with uniform spacing over the entire top surface of the dirt 11 within the flat 10. The frame supporting structure 12 is preferably made of wood although other material would be suitable. It should also be noted that the frame is substantially rectangular in shape and is of a size somewhat larger than the external size of the flat 10 so that the flat may be completely covered by the frame and the seed dispensed from the frame within the flat while the frame is spaced above the dirt 11.

The frame supporting structure 12 is provided with a multiplicity of seed receiving cups 13 arranged in a plurality of parallel rows and wherein the cups are regularly and uniformly spaced longitudinally apart in each row.

Preliminary to use of the present device, the operator must place seed of one kind into each of the multiple seed receiving cups 13. The seed receiving cups 13 are shown in greater detail in Figure 3 wherein there is one cup substantially enlarged to show detailed construction thereof. The cup has a relatively large cylindrical top portion 14 and a downwardly extending conical or inwardly tapering lower portion 15. The bottom of each cup 13 is equipped with a restricted opening 16 to permit the passage of seed downwardly therethrough. The seed is identified by the numeral 17 as shown within the cups 13. In the use of this device the frame supporting structure 12 is generally disposed in a horizontal plane thus insuring that the cups 13 shall be disposed vertically and the seed 17 will be permitted to fall by the action of gravity downwardly through the conical lower portion 15 and thus through the restricted opening 16. Thus although the opening 16 is restricted in size it is sufficiently large to permit the passage of the seed which it is desired to plant in the flat 10.

A plurality of spaced apart parallel tubular elements 18, 19, 20, 21 and 22, which are preferably made of metal are arranged longitudinally within the frame supporting structure 12 and form a fixed part of this frame structure 12. The tubular elements 18 to 22 inclusive are located beneath the cups 13 thus separating the plurality of cups 13 into longitudinal rows. The tubes 18 to 22 inclusive snugly engage the bottoms of the cups 13. As best shown in Figure 3 the tubes 18 to 22 inclusive, and as illustrated by the tube 21, have diametrically opposed and vertically positioned holes 23 and 24 at the tops and bottoms thereof at the position of each cup 13. The restricted opening 16 in the bottom of the cup 13 is thus in vertical alignment with the holes 23 and 24 in the tubes 18 to 22 inclusive. Thus the top hole or aperture 23 in the sleeve or tube member 21 forms a continuation of the seed receiving cup 13 and by reason of its alignment permits the discharge of seed 17 therethrough.

Rods or shafts 25, 26, 27, 28 and 29 are journalled for rotation within the tubes 18 to 22 inclusive respectively. It should be stated for convenience of understanding that the tubular sleeve members 18 to 22 inclusive are identical in construction and similarly the rods or shafts 25 to 29 inclusive are identical in construction so that a detailed description of one will suffice and constitute a detailed description of all of them. In the sectional showing of Figure 2 and the enlarged sectional showing of Figure 3 the shaft 28 is shown journalled within the sleeve 21. This rather long rod or shaft 28 and similarly the rods 25, 26, 27 and 29 all are provided with a series of longitudinally spaced apart depressions 30 in straight row alignment on the surface of the shafts in order to receive and dispense seed which are delivered thereto from the multiplicity of seed receiving cups 13. These depressions 30 are of a size sufficient to receive one of the large seeds 17 carried in the cups 13. There are similar depressions 30 in each of these shafts at the position of each of the cup openings 16. The depressions 30 are spaced on the shafts equidistant to the spacing of the discharge openings 16 of the seed receiving cups 13. Each of these shafts 25 to 29 inclusive is also equipped with a series of intermediately and alternately disposed smaller seed depressions 31 to accommodate and dispense smaller seeds which may be placed in the cups 13. The seed depressions 31 in the shafts 25 to 29 inclusive are alternately spaced between the large seed depressions 30 and are spaced apart from each other a distance equal to the spacing between the seed cups 13 so that when the shafts 25 to 29 inclusive are shifted longitudinally the small seed depressions 31 are aligned with each of the seed cups 13.

It has just been suggested that the shafts 25 to 29 inclusive may be shifted longitudinally to permit dispensing of seed by way of the small seed depressions 31. Means are provided for each of the shafts to permit locking of the shafts in any one of two fixed positions. As best shown in Figure 2 an annular groove 32 is provided in the shaft 28 and similarly grooves 32 are provided in each of the other rods or shafts 25, 26, 27 and 29. The annular groove 32 is disposed near the outer end of the shaft at a position adjacent the end of the frame supporting structure 12. A vertically slidable detent 33 is arranged for sliding movement within a vertical passage 33a within the frame supporting structure 12. The detent 33 has an angularly bent hand engaging portion 34 at the top thereof to enable an operator to grip the detent and raise it vertically through the passage 33a in the frame supporting structure. The lower end 35 of the detent is adapted to engage the annular groove 32 in the shaft and thus permit rotation of the shaft but prevent relative longitudinal movement of the shaft with respect to the frame supporting structure 12. A spring 36 is adapted to be attached at its upper end to a projection 37 extending outwardly from the detent 33 opposite the hand engaging portion 34. The attachment of the upper end of the spring 36 to this projection 37 is shown at 38. The lower end of the spring 36 is anchored at 39 on a pin 40 which is fastened to and forms a part of the frame structure 12. A second annular groove 41 is provided in the shafts 25 to 29 inclusive spaced longitudinally from the groove 32 a distance equal to the spacing between the large seed depressions 30 and the small seed depressions 31. Thus when the detent 33 is in engagement with the annular groove 32 the large seed depressions 30 are in alignment with and cooperate to receive seed from the seed cup 13. Similarly when the rods or shafts 25 to 29 inclusive are moved longitudinally by reason of the operator raising the plurality of detents 33 upwardly against the action of the springs 36 and the detents are permitted to engage the spaced apart annular grooves 41 the small seed depressions 31 are positioned beneath the seed receiving cups 13. It is thus obvious that the flat seeder of this invention may be used to dispense small or large seed as desired. It should further be obvious that any number of sizes of seed depressions may be incorporated on the dispensing rods or shafts 25 to 29 inclusive and provision made for their cooperation with the seed cups merely by providing other annular grooves corresponding to the grooves 32 and 41 to enable the shafts to be positioned at any desired location longitudinally with respect to the frame supporting structure 12 with any size of seed depression located beneath the seed cups.

The other end of the rods or shafts 25 to 29 inclusive are provided with gear means to enable all of the shafts to be rotated by a single turning. The shaft 25 has a gear 42 equipped with a hub 43 forming a part thereof and by means of a pin 44 the gear and hub are fixed as a unitary part of the shaft 25. A gear 45 having a hub 46 is fastened to the shaft 26 by means of a pin 47. A gear 48 with a unitary hub 49 is mounted on the shaft 47 by means of a pin 50 extending through the hub and through the shaft. Similarly a gear 51 having a hub 52 is mounted for fixed rotation with the shaft 28 by reason of a pin 53 locking the gear to the shaft. Finally a gear 54 with a unitary hub 55 is carried on the shaft 29 by reason of the pin 56 joining these members. The gears 42, 45, 48, 51 and 54 are in planar alignment and are in intermeshing relationship one with the other. This gearing of the shafts together provides for simultaneous rotation of each of the shafts 25 to 29 inclusive whenever one of the shafts is rotated.

A lateral extension 57 is provided on the centrally located shaft 27 beyond the gear 48. The lateral extension 57 carries a hand engaging turning knob 58 at the outer end thereof. The knob 58 is provided with a hub 59 and pin 60 provides for the locking of the knob to the lateral shaft extension 57. It is now quite evident that a manual rotation of the knob 58 will cause a simultaneous rotation of each of the shafts 25 to 29 inclusive. It is immaterial that each shaft will rotate in a direction opposite to its adjacent shaft.

In the device of this invention it is essential that the operator or user know when the shafts 25 to 29 inclusive are in position with the seed depressions 30 and/or 31 in an up seed receiving position. In order to accomplish this result an indexing means is provided wherein a flat or shallow depression 61 is provided in the surface of each of the shafts 25 to 29 inclusive at a position spaced from but in row alignment with the seed receiving and dispensing depressions. A vertical sleeve 62 is formed within the frame structure 12 directly above the flat or shallow depression 61. A ball 63 is vertically slidable within the sleeve 62 and is capable of seating within the flat or shallow depression 61. A spring 64 is adapted to urge the ball 63 downwardly against the shaft. A screw 65 threadedly engages cooperative internal threads 66 within the sleeve 62 thus providing for complete enclosure of the spring 64 within the frame supporting structure 12. Vertical adjustment of the screw 65 provides for a change in the strength of the spring 64 and greater or less urging of the ball 63 against the shaft. When the ball 63 is seated within the flat or shallow depression 61, the operator is required to give greater turning effort on the knob 58 to overcome the force of the spring 64. At all other positions of the shaft 28 and similarly the other rod or shaft members the ball 63 will ride around the circumference thereof without material effort on the part of the operator. However, when the shaft has made a complete revolution, the ball 63 will again seat within the socket or shallow depression 61 signaling to the operator that one revolution of the shaft is completed and the seed has been dispensed for one flat. As shown in the drawing and more particularly in Figure 1 thereof an indexing means is shown for each shaft 25 to 29 inclusive. However, one or some number of indexing means less than one for each shaft would be sufficient to provide a signaling means to the operator of the complete rotation of the shafts for the reasons that the shafts are all intergeared to each other. However, it is desirable to have each of the shafts separately indexed so the operator will know all of the seed cups are taking and delivering seed at the same time.

When the shafts 25 to 29 inclusive are shifted longitudinally to enable other sizes of seed depressions to be associated with the seed cups 13, the shallow depressions 61 employed in the shafts to index the shafts for each revolution will not be positioned beneath the spring yieldable ball 63 and hence it is necessary to provide a second flat or shallow depression 67 which is spaced longitudinally on the shafts a distance equal to the spacing between the annular grooves 32 and 41 at the other end of the shafts 25 to 29 inclusive. Thus when the shafts are shifted longitudinally the small depression 67 is positioned beneath the vertical sleeve 62 in the frame supporting structure 12 so that the spring yielding ball 63 may engage the shallow depression 67 upon each revolution of the shaft.

The final dispensing opening in the frame supporting structure 12 is shown at 68 in the form of the hole or aperture which is in alignment with the plurality of apertures 24 in the bottom of the plurality of sleeves 18 to 22 inclusive. These openings 68 thus join the bottom of the frame supporting structure 12 to the sleeves 18 to 22 inclusive.

In the operation of the flat seeder of this invention an operator places the frame supporting structure 12 substantially directly over the flat 10 to which it is desired to place seed uniformly thereover. As previously stated, the frame supporting structure 12 is slightly larger than the external dimensions of the flat 10 and thus the frame structure 12 easily rests on the top of the flat so that the bottom thereof is spaced above the top level of the dirt or soil 11 within the flat 10. When the seed dispensing device is positioned over the flat, the operator places seed desired to be planted within each of the many cups 13 by positioning these seeds through the enlarged upper cylindrical portions 14 thereof. The seeds 17 fall by gravity to the bottom of the cups which are conically shaped and thus direct the seed to the central apex or lower opening 16 in the bottom of each of the cups. The seed further passes downwardly through the top openings 23 in the metal sleeves 18 to 22 inclusive which are fixedly mounted within the frame supporting structure 12. When the shafts 25 to 29 inclusive are properly indexed with the balls 63 engaging the depressions 61 in the shafts the seed 17 will progress further downwardly into these seed receiving depressions 30 in each of the shafts at a position located directly beneath each of the seed cups 13. It is preferable that the seed depression 30 within the shafts be substantially the size of the seed to be dispensed and thus the seed may be individually dispensed and thus eliminate wastage and provide for uniform growth of the plants. In the event it is desired to plant smaller seed the operator would first raise the detents 33 and shift each of the shafts 25 to 29 inclusive longitudinally and permit reengagement of the detent 33 with the spaced apart annular grooves 41 in which event the smaller seed depressions 31 would be located beneath each of the seed receiving cups 13.

It is now time to dispense the seed downwardly from the frame supporting structure 12 so that it is deposited onto the soil 11 within the flat 10. This is accomplished by the operator manually rotating the knob 58 one revolution. It will be seen that by turning the knob 58 all of the shafts 25 to 29 inclusive rotate a single revolution and the seed, as best shown in Figure 3, will be carried around and down to a position in alignment with the bottom opening 24 in the sleeves 18 to 22 inclusive. Thereafter the seed drops downwardly through the aligned bottom openings 68 in the frame supporting structure 12. Immediately upon commencement of rotation of the shafts further downward movement of the seed 17 is prevented until the shaft is completely rotated and the seed depressions returned to the top thereof. A single revolution of the hand turning knob 58 has thus caused individual seeds to drop onto the dirt 11 in the flat 10 uniformly over the entire surface thereof at regular spacings both longitudinally and transversely apart. Thus depending upon how deep or whether or not it is desired to cover these seeds with other soil the operator's work is substantially finished and he may progress to another flat where he may repeat the operation by merely placing the dispenser on top of the flat and again rotating the hand knob 58 to effect a seeding of this second flat. It was previously stated that the rotation of adjacent shafts will be opposite and also that this opposite rotation will have no ill effects on the seeder. In other words it is merely essential that the shafts be rotated one revolution in order to dispense individual seeds and to have the seed depressions within the shaft refilled at the point of index of the shafts. The fact that the shafts rotate in opposite directions will have no consequence on the overall effect of the flat seeder simply because the only discharge for the seeds is at the bottom of the journalling sleeves or tubes 18 to 22 inclusive and the seed depressions within the shafts will reach that particular halfway point in the revolution at exactly the same time whereupon the individual seeds will be permitted to drop out from the bottom of the frame supporting structure 12 and the seed receiving depression permitted to move upwardly to its seed receiving position from the cups 13.

I am aware that numerous details of construction may be varied throughout a wide range without departing from the principles disclosed herein and I therefore do not propose limiting the patent granted hereon otherwise than as necessitated by the appended claims.

What is claimed is:

1. A flat seeder comprising a frame structure, a plurality of regularly spaced apart seed receiving cups, each of said cups having small individual apertures at the bottom thereof for dispensing seed therefrom, rod means rotatably journalled in said frame structure, said rod means disposed beneath said seed receiving cups and in contact with the small apertures in the bottoms thereof, said rod means having seed depressions at the position of each seed cup, whereby rotation of said rod means causes a discharging of seed from each seed receiving cup, said seed receiving cups arranged in aligned parallel rows, said rod means including a separate rod for each of the aligned, parallel rows, each of said separate rods having a gear mounted on one end thereof, and said gears disposed in alignment and each pair of adjacent gears being in operative engagement with each other, means for rotating one of said gears whereby all of the separate rods are rotated, and means for indexing said rod means with the seed depressions in an up seed receiving position.

2. A flat seeder comprising a frame structure, a plurality of regularly spaced apart seed receiving cups, each of said cups having small individual apertures at the bottom thereof for dispensing seed therefrom, rod means rotatably journalled in said frame structure, said rod means disposed beneath said seed receiving cups and in contact with the small apertures in the bottoms thereof, said rod means having seed depressions at the position of each seed cup, whereby rotation of said rod means causes a discharging of seed from each seed receiving cup, and means for indexing said rod means with respect to said frame structure at a position wherein the seed depressions are upwardly opening to receive seed from seed receiving cups.

3. A device as set forth in claim 2 in which the means for indexing include flat portions on said rod means and spring extended detents carried in said frame structure arranged and constructed to engage said flat portions.

4. A flat seeder comprising a frame structure, a plurality of regularly spaced apart seed receiving cups, each of said cups having small individual apertures at the bottom thereof for dispensing seed therefrom, rod means rotatably journalled in said frame structure, said rod means disposed beneath said seed receiving cups and in contact with the small apertures in the bottoms thereof, said rod means having seed depressions at the position of each seed cup, whereby rotation of said rod means causes a discharging of seed from each seed receiving cup, auxiliary seed depressions of a different size equally spaced apart and positioned intermediate said first named seed depressions, means for moving said rod means lengthwise in said frame structure whereby the auxiliary seed depressions may be moved to position beneath the seed receiving cups.

5. A device as set forth in claim 4 and further including means for selectively locking said rod means in either longitudinal position wherein either the first named seed depressions or the auxiliary seed depressions are positioned beneath the seed receiving cups.

6. A device as set forth in claim 5 in which the means for selectively locking the rod means comprising spaced apart annular grooves in said rod means and detent means in said frame structure for engaging either of said annular grooves whereby the rod means is held against relative longitudinal movement with respect to said frame structure but permitting rotational movement.

7. A seed dispensing device comprising a supporting structure, a seed receiving cup mounted vertically on said supporting structure, a shaft journalled for rotation on said supporting structure in a transverse position beneath and in engagement with the underside of said seed receiving cup, said seed receiving cup having a small opening in the bottom thereof communicating with said shaft, said shaft having a seed receiving and dispensing depression therein, whereby seed in said seed receiving cup will be delivered to said seed receiving and dispensing depression in the shaft when the depression is in an up position adjacent the small opening in the bottom of the seed receiving cup, and means for rotating said shaft for dispensing the seed in the shaft depression downwardly, the said shaft having various sizes of seed receiving depressions therein spaced longitudinally apart, and means for selectively locking said shaft in various positions whereby any desired size seed receiving depression may be positioned in engagement with said seed receiving cup.

8. A device as set forth in claim 7 in which said means for selectively locking said shaft includes a plurality of longitudinally spaced apart annular grooves, said annular groove spacing being identical to the spacing between the various sizes of seed receiving depressions, and detent means mounted on said supporting structure and arranged and constructed to selectively engage any one of said annular grooves for holding said shaft against separate longitudinal movement with respect to said supporting structure and simultaneously permitting rotation of said shaft.

References Cited in the file of this patent
UNITED STATES PATENTS

| 50,916 | Davis | Nov. 14, 1865 |
| 416,498 | Richardson | Dec. 3, 1889 |
| 694,069 | Noechel | Feb. 25, 1902 |
| 1,179,336 | Rhodes | Apr. 11, 1916 |
| 1,721,137 | Schmidt | July 16, 1929 |
| 2,639,060 | Mantell | May 19, 1953 |